(12) United States Patent
Vashisht

(10) Patent No.: US 11,665,188 B1
(45) Date of Patent: May 30, 2023

(54) SYSTEM AND METHOD FOR SCANNING REMOTE SERVICES TO LOCATE STORED OBJECTS WITH MALWARE

(71) Applicant: FireEye Security Holdings US LLC, Milpitas, CA (US)

(72) Inventor: Sai Vashisht, Morgan Hill, CA (US)

(73) Assignee: FireEye Security Holdings US LLC, San Jose, CA (US)

( * ) Notice: Subject to any disclaimer, the term of this patent is extended or adjusted under 35 U.S.C. 154(b) by 0 days.

(21) Appl. No.: 17/844,644

(22) Filed: Jun. 20, 2022

Related U.S. Application Data

(63) Continuation of application No. 16/231,074, filed on Dec. 21, 2018, now Pat. No. 11,368,475.

(51) Int. Cl.
*H04L 9/40* (2022.01)
*G06F 16/9535* (2019.01)

(52) U.S. Cl.
CPC ...... *H04L 63/1425* (2013.01); *G06F 16/9535* (2019.01); *H04L 63/10* (2013.01)

(58) Field of Classification Search
CPC ................. H04L 63/1425; H04L 63/10; G06F 16/9535
See application file for complete search history.

(56) References Cited

U.S. PATENT DOCUMENTS

| | | | | |
|---|---|---|---|---|
| 8,661,547 B1 * | 2/2014 | Kononov | ............ | G06F 16/122 713/176 |
| 2005/0283837 A1 * | 12/2005 | Olivier | ................ | G06F 21/56 726/24 |
| 2011/0131499 A1 * | 6/2011 | Ferris | .................. | G06F 3/067 709/224 |
| 2012/0023579 A1 * | 1/2012 | Zaitsev | ................ | G06F 21/577 726/23 |
| 2012/0084859 A1 * | 4/2012 | Radinsky | ............. | G06F 21/56 707/E17.046 |
| 2013/0067549 A1 * | 3/2013 | Caldwell | ............... | H04L 67/52 709/206 |

(Continued)

OTHER PUBLICATIONS

Doelitzscher et al., "An Autonomous Agent Based Incident Detection System for Cloud Environments", Nov. 2011, IEEE Third International Conference on Cloud Computing Technology and Science, pp. 197-204 (Year: 2011).*

*Primary Examiner* — Kenneth W Chang
(74) *Attorney, Agent, or Firm* — Rutan & Tucker LLP

(57) ABSTRACT

A non-transitory storage medium including software for detecting malicious objects stored at a cloud-based remote service is described. Herein, the software includes first, second and third logic modules. The first logic module is configured to (i) identify the cloud-based remote service hosting one or more objects and (ii) acquire access the one or more objects stored within the cloud-based remote service. The second logic module is configured to retrieve the one or more objects from the cloud-based remote service and submit the object(s) to a plurality of analytic engines. Each analytic engine is configured to conduct analytics on at least a first object of the object(s) and generate results based on the analytics conducted on at least the first object. The third logic is configured to conduct an analysis of meta-information associated with the first object to determine whether the first object is to be classified as malicious or benign.

18 Claims, 7 Drawing Sheets

(56) References Cited

U.S. PATENT DOCUMENTS

| | | | |
|---|---|---|---|
| 2013/0145437 A1* | 6/2013 | Zaitsev | H04L 63/145 |
| | | | 726/4 |
| 2014/0208426 A1* | 7/2014 | Natarajan | H04L 63/1441 |
| | | | 726/23 |
| 2015/0331905 A1* | 11/2015 | Brand | H04L 63/20 |
| | | | 707/770 |
| 2016/0283944 A1* | 9/2016 | Hubbard | G06Q 20/321 |
| 2016/0366119 A1* | 12/2016 | Rykowski | G06F 21/41 |
| 2017/0372070 A1* | 12/2017 | Burdett | H04L 63/1425 |

* cited by examiner

SYSTEM AND METHOD FOR SCANNING REMOTE SERVICES TO LOCATE STORED OBJECTS WITH MALWARE

CROSS-REFERENCE OF RELATED APPLICATIONS

This application is a continuation of U.S. patent application Ser. No. 16/231,074 filed Dec. 21, 2018, now U.S. Pat. No. 11,368,475 issued Jun. 21, 2022, the entire contents of which are incorporated by reference.

FIELD

Embodiments of the disclosure relate to the field of cybersecurity. More specifically, one embodiment of the disclosure relates to a comprehensive cybersecurity system configured to access and analyze objects, stored within one or more remote services, for malware.

GENERAL BACKGROUND

Cybersecurity attacks have become a pervasive problem for organizations as many electronic devices within an enterprise network have been subjected to attack and compromised. A cybersecurity attack (sometimes referred to as a "cyberattack") constitutes a threat to security of an electronic device or a network itself caused by infiltration of content, such as executable (e.g., script, one or more commands, program, etc.) for example, with the intent to perpetrate unwanted, malicious or criminal activity. This type of content is generally referred to as "malware." Upon infiltration, the malware may lay dormant until activated in response to an activity by an unsuspecting user, such as opening an electronic mail (email) message, opening an attachment, or selecting a Uniform Resource Locator (URL) link.

Recently, email messages have become a significant cybersecurity threat vector for circumventing cybersecurity defenses to infect an electronic device connected to a network. Commonly, email cybersecurity solutions analyze email messages for cybersecurity risk (i) during transit to or upon receipt by an email server, or (ii) when the email message is being "opened" by an email client application being controlled by a user. Such email cybersecurity solutions do not analyze and detect resident malicious email messages (e.g., previously received email messages including malware) currently residing in user mailboxes. Stated differently, conventional cybersecurity solutions fail to offer any ability to analyze, for malware, any email messages already received, stored and allocated to different user mailboxes by an email server prior to installation of the cybersecurity solution or where malicious email messages evade cybersecurity defenses due to ineffective (inadequate or out of date) detection definitions. The conventional cybersecurity solutions are directed to monitoring and analyzing received incoming email messages for malware, not analyzing email messages already residing in the email server.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
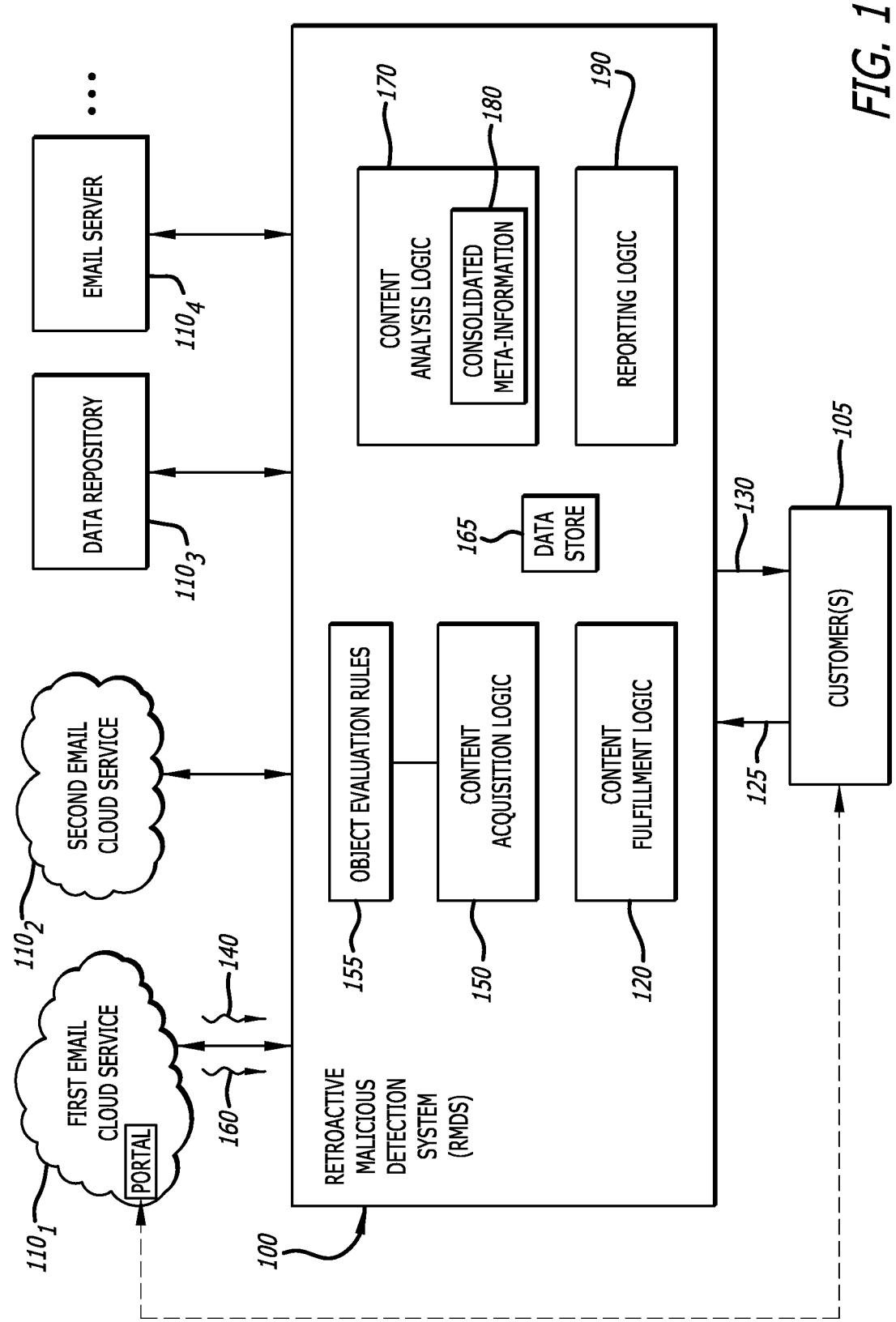
FIG. 1 is a block diagram of an exemplary embodiment of a retroactive malicious detection system (RMDS).

Embodiments of the present disclosure generally relate to a cybersecurity system and method that, depending on the embodiment, secures requisite credentials to retrieve stored objects (e.g., email messages, files, etc.) from a remote service to analyze whether the stored objects may include malware. As defined below, a remote service may correspond to a cloud-based hosted service by a third-party provider. For example, the remote service may operate as a cloud-based hosted service such as a cloud-based file data store (e.g. Dropbox), a cloud-based email and document data store (e.g., Microsoft® Office 365), a cloud-based server infrastructure service (e.g., Amazon Web Services "AWS" or Microsoft® Azure), or the like. Given the flexibility and cost savings offered by cloud-based hosted services, a greater number of companies are migrating to these services. In doing so, the protection of the stored data from malware infection is solely dependent on the security features deployed by the remote service, which may be devoid of advanced malware detection.

In particular, requests initiated from the cybersecurity system to a remote service, such as a scan request message directed to a particular type of cloud-based hosted service for example, is designed to gain access to its proprietary framework and retrieve objects based on presented customer information and received customer authorization. The customer authorization is provided to the cybersecurity system, thereby granting access to the retrieval of objects located in the remote service. The object may include email messages, documents, information for connectivity to cloud-based infrastructure, or the like.

Herein, as the number and sophistication of cyberattacks grows, subscribers to cloud-based hosted services are deeply concerned about the privacy and safety of their data. To address these concerns, there is a growing, yet unfulfilled need, for a secondary layer of defense in which customers (or subscribers) utilize their own selected data processing mechanisms, such as the cybersecurity system described below, to analyze their own stored data for malware that, if downloaded, may compromise their networks and/or resources. To gain access to the remote services, such as the cloud-based hosted services described herein, the cybersecurity system obtains the requisite credentials to access the remote service and retrieve stored otherwise present in one or more customer's hosted remote services, such as a cloud-based email service. Upon receipt of the objects, the cybersecurity system submits all or a subset of the retrieved objects to one or more resources that perform analytics on the submitted objects, aggregates results from the analytics, and generates a report based on the analytics of these submitted objects.

As an illustrative embodiment, the cybersecurity system may be configured to (i) retrieve objects (e.g., email messages) from a selected remote service hosting one or more electronic mailboxes and (ii) perform selective analytics on all or a subset of the retrieved email messages (hereinafter, "submitted email messages") in an attempt to detect whether any of the submitted email messages includes malware. In particular, the cybersecurity system, referred to as a "retroactive malicious detection system" (RMDS), identifies a remote service hosting the one or more electronic mailboxes for analysis and retrieves email messages maintained in the hosted electronic mailbox(es) based on permitted access to the remote service using acquired access credentials. Thereafter, the RMDS optionally performs a filtering operation to reduce the number of retrieved email message to a particular subset of "suspicious" email messages, and thereafter, submits each of the subset of "suspicious" email messages to one or more analytic engines for analysis. The selection of the analytic engines may vary, depending on the type of object (e.g., email, file, document, image, etc.), the type of remote service from which the email messages were retrieved (e.g., cloud-based email service, email server, remote file system, etc.), and/or the type of customer issuing the scan request message causing retrieval of the email messages.

The RMDS further performs a correlation of the analytic results directed to the same email message from different analytic engines. This correlation may involve aggregating results from the different analytic engines, where the results include meta-information and other context information gathered during analysis of the email message for malware, along with meta-information associated with the email message prior to submission to the analytic engines. Depending, at least in part, on meta-information obtained from the scan request message that prompted retrieval of the email message (e.g., an identifier assigned to the customer that may imply reason for the scan, etc.), the RMDS may correlate the analytic results differently to account for a different report format.

For example, a scan request message initiated by a customer (e.g., any authorized user of the RMDS such as a subscriber, an cyber-incident investigation and response (IR) team member, etc.) may request analytics to be conducted by all analytic engines and all meta-information generated from the analytics is captured and returned to the RMDS. Upon detecting the IR team identifier as the source initiating the scan request message, the RMDS may perform a more comprehensive aggregation and meta-information retention scheme of the analytic results than normal because the meta-information is also being used to detect susceptibility of the remote service to an attack. This may contradict aggregation and meta-information retention schemes conducted by the RMDS during a periodic scan, where the customer identifier may cause the RMDS to utilize a lesser number of analytic engines or capture and aggregate a lesser amount of meta-information (e.g., timestamp, email source, email title, etc.) for use in classification.

Lastly, the RMDS further classifies the email message as "malicious" or "benign" based on the correlated analytic results from potentially multiple analytic engine(s), which may include aggregating meta-information and other context information received from the multiple analytic engines and weighting the analytic results based on classification rules established for the current threat landscape. The classification rules may be updated on a periodic or aperiodic basis. The context information associated with the email message is organized into a prescribed format, perhaps depending on the customer that initiated the scan request message, that facilitates generation of a malware detection report output from the RMDS. The malware detection report at least identifies the malicious email messages stored within the remote email service along with the context information, such as meta-information associated with the malicious email messages (e.g., customer identifier, source address such as IP address or contents of "FROM:" field, time of receipt, or the like). The malicious detection report (or information within the report) may be provided as an alert to the customer to notify of the presence of malware and response to customer requests to mitigate the malware (e.g., delete email, disinfect, quarantine, etc.) and/or alert the third party platform provider to assist in the mitigation of the malware infection, if necessary.

Hence, the RMDS may be configured to provide an interface for receipt of credentials to access a set of (e.g., one or more) remotely hosted electronic mailboxes. Alternatively, in some embodiments, the RMDS may be configured to exchange authorization tokens (OAuth) with a third-party controlled web server for granting access to at least a set of (e.g., one or more) user mailboxes. The RMDS may generate, based on a classification of the email messages in the authorized set of user mailboxes, a malware detection report describing (i) the classification of each mailbox of the set of authorized mailboxes, (ii) the classification of each email message within the set of authorized mailboxes, and/or (iii) the malicious classification of email message(s) within the set of authorized mailboxes.

In some embodiments, the RMDS may dynamically scale up or down the number of available analytic engines in order to improve and/or maintain throughput as well as preserve analytic resources for specified classes of customers (e.g., trial customers allocated lesser analytic resources than paid subscribers, etc.). Similarly, the RMDS may monitor system properties of the RMDS and limit analyses where certain thresholds and/or traits (e.g. number of subscribers, number of email messages queued for analytics, etc.) are exceeded.

Embodiments of the above-described cybersecurity system (RMDS) are directed to handling email message analytics. However, the RMDS may be applicable to coordinating analytics and reporting of the analytic results for other types of object besides email messages, such as files residing in cloud stored file repositories, stored images and/or videos, or the like.

I. Terminology

In the following description, certain terminology is used to describe aspects of the invention. In certain situations, each of the terms "logic" or "engine" is representative of hardware, firmware, and/or software that is configured to perform one or more functions. As hardware, the logic (or engine) may include circuitry having data processing or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or engine) may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "electronic device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of an electronic device may include, but are not limited or restricted to, the following: a server, a mainframe, a firewall, a router; or an endpoint device (e.g., a laptop, a smartphone, a tablet, a desktop computer, a netbook, gaming console, a medical device, or any general-purpose or special-purpose, user-controlled electronic device).

The term "meta-information" generally refers to a collection of information associated with an object (e.g., an email message or a portion of the email message; a file or portion of the file, etc.), which may be received from a plurality of remote services (e.g., cloud-based hosted service including one of a cloud-based email service, cloud-based file data store, cloud-based email service, email server, etc.). For example, the meta-information may include information pertaining to a source of a request for an object as provided from a remote service (e.g., customer identifier, device identifier, etc.) and information pertaining to the object (and analyses associated with the object), as described below. Each object may be initially determined to be of an unknown classification (e.g., not previously analyzed or analyzed with inconclusive results), and after an analysis, the object may be determined to be a known classification (e.g., benign or malicious). This classification of an object is referred to as rendering a "verdict."

One type of meta-information is referred to as "consolidated meta-information," including the collection of meta-information pertaining to an object that may analyzed by a single analytic engine or different analytic engines. The consolidated meta-information for an object under analysis may include, but is not limited or restricted to any or all of the following: (a) distinctive metadata pertaining to the object (e.g., hash value, checksum, or other identifier (ID) for an object); (b) one or more verdicts rendered for the object; (c) a timestamp associated with each verdict; (d) a consolidated verdict that is determined based on an aggregate (unweighted or weighted) of verdicts rendered for the object from one or more analytic engines; and/or (e) information directed to the source of the object (e.g., source identifier, etc.).

The term "object" generally refers to content in the form of an item of information having a logical structure or organization that enables it to be classified for purposes of analysis for malware. One example of the object may include an email message or a portion of the email message. Another example of the object may include a storage file or a document such as a Portable Document Format (PDF) document, a word processing document such as Word® document, or other information that may be subjected to cybersecurity analysis. The object may also include an executable such as an application, program, code segment, a script, dynamic link library "dll," URL link, or any other element having a format that can be directly executed or interpreted by logic within the electronic device.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format.

The term "computerized" generally represents that any corresponding operations are conducted by hardware in combination with software and/or firmware.

As briefly described above, the term "malware" may be broadly construed as malicious software that can cause a malicious communication or activity that initiates or furthers an attack (hereinafter, "cyber-attack"). Malware may prompt or cause unauthorized, unexpected, anomalous, unintended and/or unwanted behaviors (generally "attack-oriented behaviors") or operations constituting a security compromise of information infrastructure. For instance, malware may correspond to a type of malicious computer code that, upon execution and as an illustrative example, takes advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience attack-oriented behaviors. The attack-oriented behaviors may include a communication-based anomaly or an execution-based anomaly, which, for example, could (1) alter the functionality of a network device in an atypical and unauthorized manner; and/or (2) provide unwanted functionality which may be generally acceptable in another context.

A "remote service" may correspond to a "cloud-based hosted service" or a "hosted service". A cloud-based hosted service may be generally interpreted to be a multi-tenant service made available to users on demand via a public network (e.g., Internet) from one or more cloud computing provider's servers. These servers may include virtual partitions to separate data maintained on behalf of the user in efforts to protect the security and privacy of the data. A "hosted service" may be generally interpreted as a single-tenant service provided by a company's own on-premises servers, which may be hosted by a third-party provider responsible for server management or by an administrator for the company. Examples of a hosted service may include, but is not limited or restricted to a Microsoft® Exchange® server, a file repository, or the like.

In certain instances, the terms "compare," "comparing," "comparison," or other tenses thereof generally mean determining if a match (e.g., identical or a prescribed level of correlation) is achieved between two items where one of the items may include content within meta-information associated with the object.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Retroactive Malicious Detection System (RMDS)

Referring to FIG. 1, a block diagram of an exemplary embodiment of a retroactive malicious detection system (RMDS) 100 is shown. Herein, the operations of the RMDS 100 are directed toward the retrieval and analysis of objects from any of a plurality of third-party controlled, remote services $110_1$-$110_N$, such as a first email cloud-based service $110_1$ hosted by Microsoft® Azure®, a second email cloud-based service $110_2$ hosted by Amazon® Web Services, a data repository $110_3$, an email server $110_4$, or the like. As described herein, the objects may include stored email messages, although the RMDS 100 may be configured to support retrieval and analysis of other types of stored objects (e.g., files, videos, images, documents, etc.).

As shown in FIG. 1, for this embodiment of the disclosure, the RMDS 100 may include content fulfillment logic 120, content acquisition logic 150, content analysis logic 170, and reporting logic 190. The content fulfillment logic 120 is configured to generate a redirect message 130 in response to a scan request message 125. The scan request message 125 corresponds to a request initiated by an electronic device associated with a customer to conduct analytics on content maintained at a remote service (e.g., a cloud-based email service) $110_1$. The individual customer and/or the electronic device controlled by the customer may be referred to herein as the "customer" 105.

According to one embodiment of the disclosure, the redirect message 130 may include a Uniform Resource Locator (URL) link that, when selected, redirects the customer 105 to an authentication portal 135. For this embodiment, the authentication portal 135 may operate as (i) a logon page that may be provided by the remote service $110_1$ (as shown) in order to gain access to its stored contents or (ii) a logon page associated with a trusted third-party web service account (e.g., FaceBook® account, Google® Gmail, DropBox®, etc.) whose authentication is recognized by the remote service $110_1$. The logon page is provided to allow the customer 105 to enter her or his credentials for confirmation by credential verification logic (not shown), which may be hosted at a server associated with the trusted third-party or at a server associated with the remote service $110_1$.

The redirected URL link may further include address information associated with the RMDS 100 (or an identifier described below) for use by the credential verification logic (or logic operating in concert with the credential verification logic) to return information (e.g., credential token 140) upon authentication of the consumer 105. In particular, for this embodiment of the disclosure, upon receipt and verification of the customer credentials, the credential verification logic of the remote service $110_1$ extracts address information for the RMDS 100 included in the redirected URL link and returns the credential token 140 directly to the RMDS 100.

In another similar embodiment, the permitted acquisition of the credential token 140 by the RMDS 100 may be accomplished through an OAuth 2.0 Authorization Framework or a similar framework. For example, the RMDS 100 (or an administrator for the RMDS 100) may register itself as logic that is authorized to operate as an agent for the customer 105 (and other customers) to gain access to stored data pertaining to the customer within the remote service $110_1$. During registration, the RMDS 100 (or the administrator) provides one or more network addresses upon which any issued credentials (e.g., credential token 140) for accessing stored content within the remote service $110_1$ is directed. Upon registration, the RMDS 100 may be assigned an identifier by the remote service $110_1$. Thereafter, the redirect message 130, generated (or prompted) by the RMDS 100 in response to the scan request message 125 seeking authorization to access the stored content within the remote service $110_1$ to perform a malware analysis, may include the identifier for the RMDS 100. The identifier may be used by the remote service $110_1$ to identify a hosted application (e.g., whole or part of RMDS 100) seeking authorization to access the stored data (on behalf of the customer). For some embodiments, the RMDS 100 receives a returned response, which may include a result of the authentication of the customer (Success/Failure) and the credential token 140.

Upon receipt of the credential token 140, the content acquisition logic 150 may obtain requisite objects 160 from the particular remote service $110_1$. As shown, the RMDS 100 may be communicatively coupled to the plurality of remote services $110_1$-$110_N$. The receipt of the credential token 140 enables the RMDS 100 to recover objects 160 from the remote service $110_1$, namely as email messages 160 from one or more user mailboxes maintained within the first cloud-based email service $110_1$ for the customer.

Upon receipt of email messages 160 retrieved from the first cloud-based email service $110_1$, the content acquisition logic 150 analyzes the content of each email message in accordance with object evaluation rules 155 loaded into the RMDS 100 or accessible to the content acquisition logic 150 from a remote source. When operating in accordance with the object evaluation rules 155, the content acquisition logic 150 determines whether any of the recovered email messages 160 is deemed to be "suspicious," namely the email message includes characteristics that encourage further analysis by one or more analytic engines (described below). For example, the object evaluation rules 155, when processed, may identify that any email message including a URL is identified as a "suspicious" email message. Similarly, the object evaluation rules 155, when processed, may identify that any email message including an attachment less than a prescribed size (e.g., in kilobytes) is a "suspicious" email message. The suspicious email messages may be stored in a local data store 165 for subsequent access by the content analysis logic 170. The non-suspicious emails are removed from further analysis.

The content analysis logic 170 may include one or more analytic engines (M≥1), which perform analytics on the suspicious email messages to produce results that are gathered as consolidated meta-information 180 (described below) by analytics correlation logic being part of the content analysis logic 170. The analytics correlation logic organizes the consolidated meta-information 180 from the "M" analytic engines and provides this information to analytics classification logic also being part of the content analysis logic 170. The analytics classification logic determines whether the object is malicious or benign, where such determinations along with at least portions of the consolidated meta-information 180 is provided to the reporting logic 190 for output.

III. RMDS Registration Process

Figure 2:
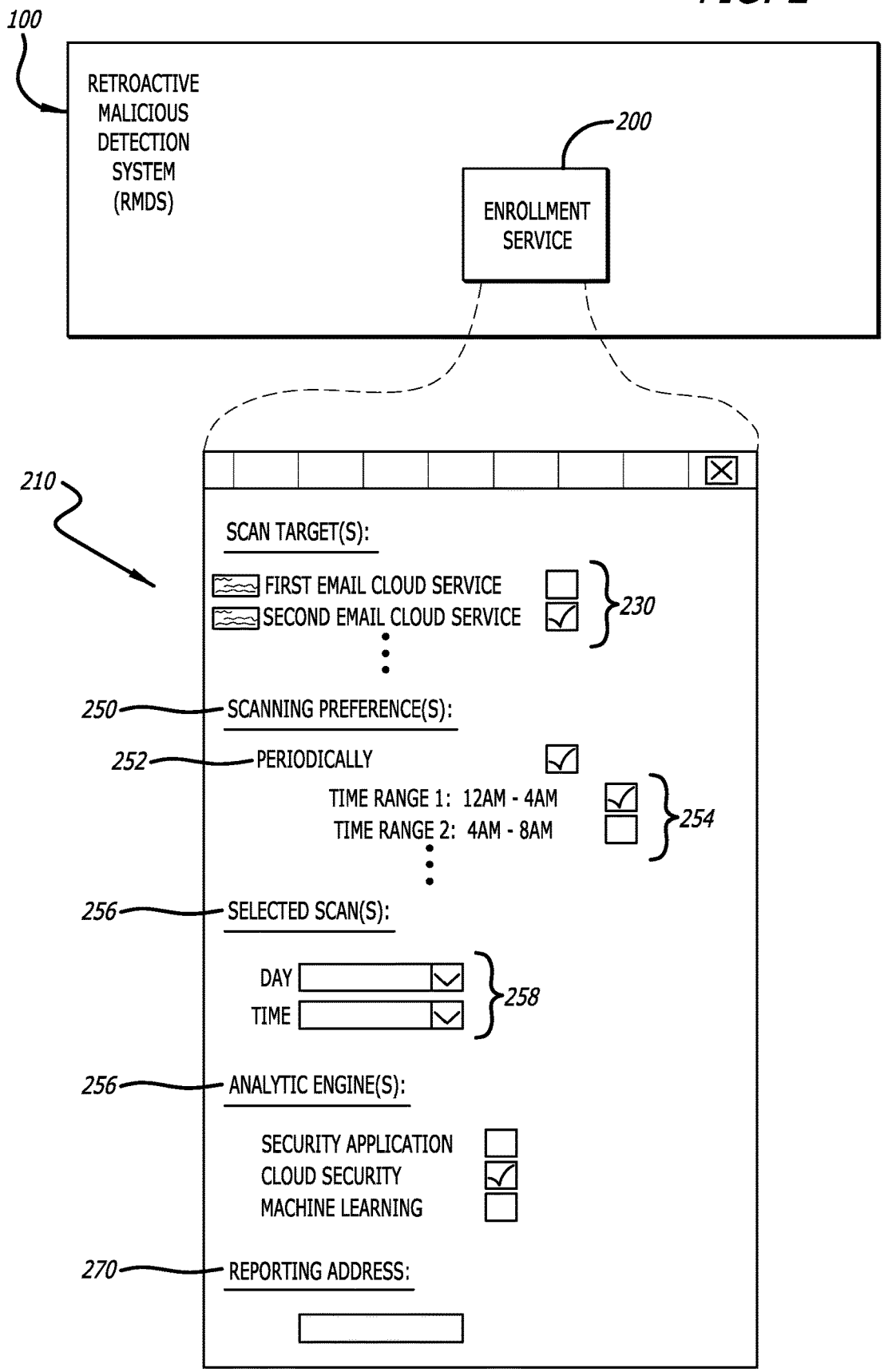
FIG. 2 is an exemplary embodiment of a registration process for the retroactive malware detection system (RMDS) of FIG. 1.

Referring now to FIG. 2, a block diagram of an exemplary embodiment of a registration process for the RMDS of FIG. 1 is shown. The RMDS 100 may be configured as a subscription service, where a customer registers with an enrollment service 200 provided by the RMDS 100. The enrollment service 200 may be configured as (i) a daemon process running in the background where RMDS 100 corresponds to a web-based application or (ii) logic providing certain functionality to the RMDS 100. The enrollment service 200 collects a user name, organization details, administrative details, or other data to uniquely identify a particular customer to the RMDS 100. Additionally, the enrollment service 200 may generate one or more displayable elements 210 (e.g., pop-ups, web pages, etc.) to gather customer preferences 220. These preferences 220 may identify the scan targets 230 such as any of the remote services to which scanning (e.g., analysis of stored objects) is available. The remote services $110_1$-$110_N$ (e.g., first cloud-based email service $110_1$, file depository $110_3$, etc.) may be identified by indicia (e.g., trademark) and/or text characters. Additionally, the preferences 220 may identify (i) scanning preferences 250 such as periodicity of any automated scanning 252 with selectable scan time periods 254 or a prescribed advanced scanning time 256 (e.g., with selectable date/hour 258), and/or (ii) analytic engine preferences 260 (described below) selected by the customer for objects retrieved from a particular remote service $110_1$-$110_N$ or selected by a preselected default setting based at least on the particular type of retrieved object, and/or (iii) a selected network address 270 for use in transmission of malware detection reports after analytics are conducted on the retrieved objects, or the like.

IV. RMDS Internal Architecture

Figure 3:
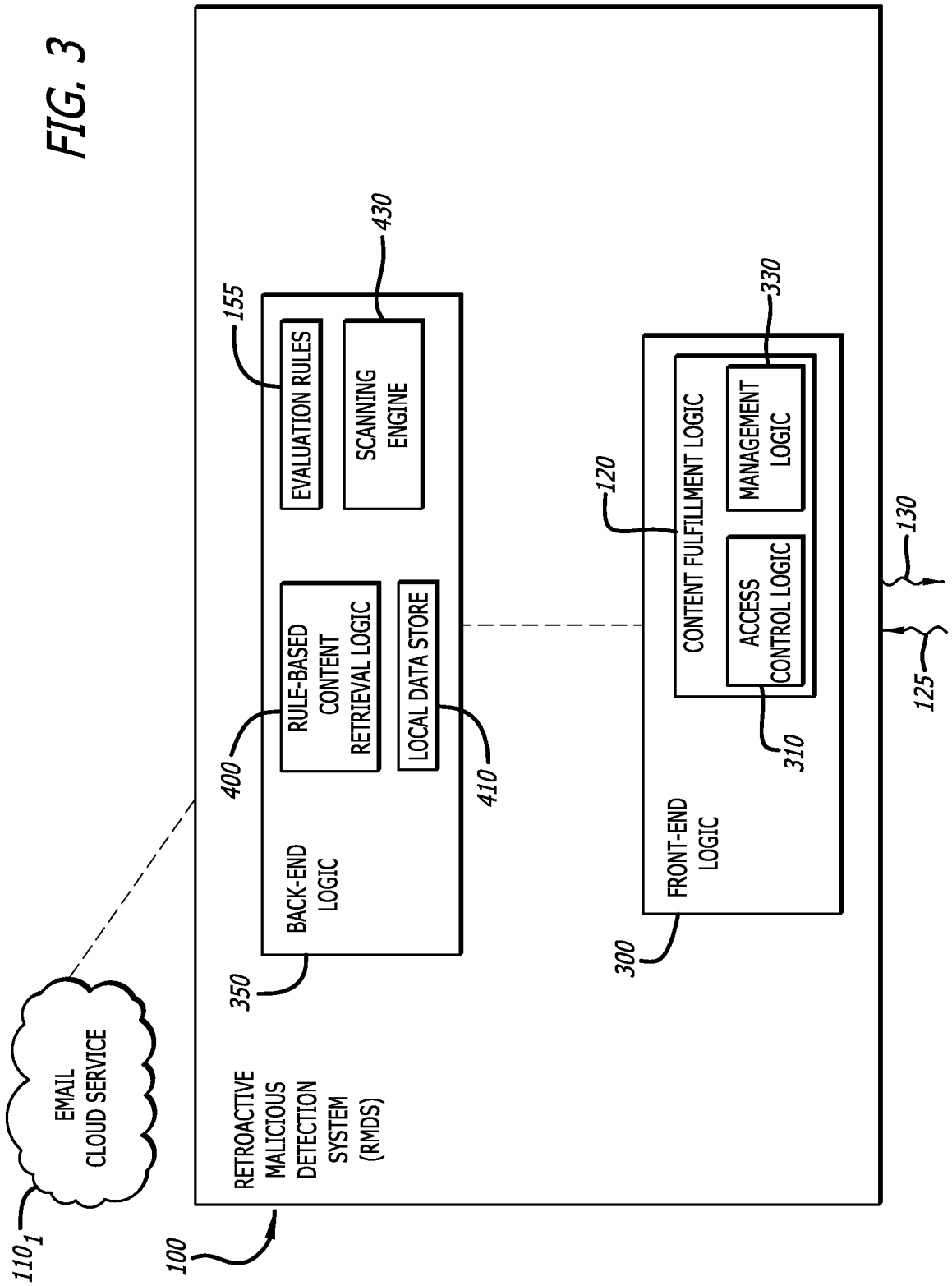
FIG. 3 is an exemplary embodiment of frontend and backend logic deployed within the retroactive malicious detection system (RMDS) of FIG. 1.

Referring now to FIG. 3, an exemplary embodiment of the logic deployed within the retroactive malicious detection system (RMDS) 100 of FIG. 1 is shown. The RMDS 100 includes front-end logic 300 and back-end logic 350. Herein, according to one embodiment of the disclosure, the front-end logic 300 includes the content fulfillment logic 120 of FIG. 1. Featuring access control logic 310 and management logic 330, the content fulfillment logic 120 is configured to receive the incoming scan request message 125 from the particular customer that requests scanning (analysis) of objects within a particular remote service, such as analytics directed to email messages stored within the first cloud-based email service $110_1$ to detect the presence of any malicious email messages. For this example, the customer may operate as an incident response provider that conducts a scan (analytics) of stored email messages within a particular user mailbox or multiple user mailboxes to trace a detected cyberattack back to its source. As another example, the customer may operate as a subscriber to a paid subscription service offered by the RMDS 100, where the scan (analytics) may correspond to a fee-based scan directed to one or more user mailboxes identified by the scan, where the fee may be computed based on the number of mailboxes scanned or the number of email message retrieved for analysis. The scope of the scan may be defined by search parameters set forth in the scan request message 125 or selected upon registration as shown in FIG. 2.

The access control logic 310 is responsible for determining how to access content associated with the scan request message 125. This determination may be based on what remote service is to be accessed in retrieval of the objects for analytics and/or the type of objects being analyzed. For instance, where the scan request message 125 is directed to conducting analytics on email messages within one or more Microsoft® Office 365® email accounts for a particular individual or group of individuals hosted by the first cloud-based email service $110_1$, the access control logic 310 may control certain authentication operations and/or access to particular application programming interfaces (APIs) to obtain credentials for the back-end logic 350 to access these Microsoft® (Outlook) email accounts. Alternatively, where the scan request message 125 is directed to conducting analytics on email messages maintained within one or more Google® mail (Gmail) accounts for a particular individual or group of individuals hosted by the second cloud-based email service $110_2$, the access control logic 310 may control certain authentication operations and access to particular APIs utilized to access content from Gmail accounts. These authentication operations may differ, in whole or in part, from the authentication operations and/or APIs utilized to access stored content in certain Microsoft® (Outlook) email accounts.

The management logic 330 is responsible for monitoring and controlling the scan operations once the access credentials (e.g., credential token) have been secured and content may be retrieved from the particular remote service. As shown in more detail in FIG. 3, the management logic 330 controls operability of rule-based content retrieval logic 400, which is responsible for retrieving objects from the remote service based on at least a portion of the object evaluation rules 155 established for object retrieval for that particular remote service. For instance, a portion of the object evaluation rules 155 utilized by the content retrieval logic 400 of FIG. 4 for retrieval of email messages from the first cloud-based email service $110_1$ hosted by Microsoft® Azure® may be different from a portion of the object evaluation rules 155 followed by the content retrieval logic 400 for retrieval of email messages from the second cloud-based email service $110_2$ hosted by Amazon® Web Services, or even an email server such as a Microsoft® Exchange® server $110_4$. Additionally, or in the alternative, the management logic 330 may be configured to control operability of the scanning engine 430 of FIG. 4, which is responsible for selecting analytic search engines for analyzing the object(s) retrieved from the content retrieval logic 400 and/or a local data store 410 associated with the content retrieval logic 400 being part of the back-end logic 350.

Figure 4:
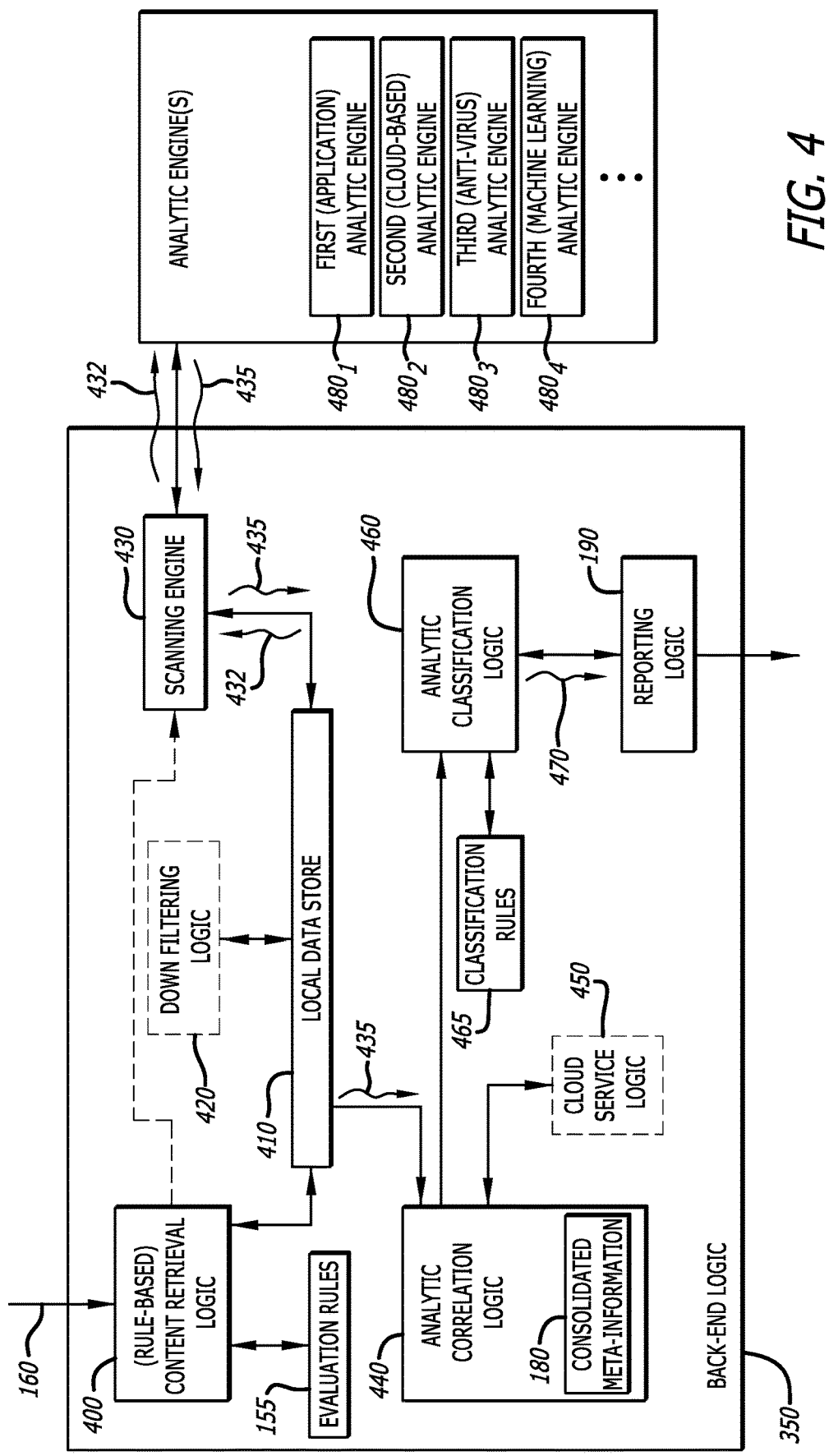
FIG. 4 is a more detailed, exemplary embodiment of the backend logic of the retroactive malware detection system (RMDS) of FIG. 3.

Referring now to FIG. 4, an exemplary embodiment of the backend logic 350 of the RMDS 100 is shown. For this embodiment of the disclosure, the backend logic 350 comprises (i) rule-based content retrieval logic 400, (ii) local data store 410; (iii) down filtering logic 420; (iv) scanning engine 430, (v) analytics correlation logic 440, (vi) cloud services logic 450; (vii) analytic classification logic 460; and (viii) reporting logic 190.

Herein, the rule-based, content retrieval logic 400 is configured to retrieve one or more objects from a particular remote service (e.g., second cloud-based email service $110_2$) of the plurality of remote services $110_1$-$110_N$ upon receipt of corresponding access credentials from the access control logic 310. According to this embodiment of the disclosure, depending on the scan request message 125, the content retrieval logic 400 may retrieve email messages from the second cloud-based email service $110_2$. For example, the scan request message 125 may request an analysis of all email messages associated with a particular user mailbox or a group of user mailboxes. Similarly, the scan request message 125 may request an analysis of a prescribed number of email messages associated with a particular user mailbox or a group of user mailboxes, or an analysis of email messages received and/or sent over a prescribed period of time (e.g., certain hour, day, or any series of days such as a particular week, month, etc.).

The content retrieval logic 400 may further perform one or more preliminary analyses in accordance with object evaluation rules 155 loaded into the RMDS 100 or accessible to the content retrieval logic 400. When operating in accordance with the object evaluation rules 155, the preliminary analyses performed by the content retrieval logic 400 may involve a determination as to whether any of the recovered email messages 160 is deemed to be "suspicious," namely any of the recovered email messages 160 feature characteristics that are suggestive of maliciousness. Examples of certain characteristics may feature inclusion of a URL within a body portion of an email message, inclusion of an attachment, or the like. The suspicious email messages may be stored in the local data store 410 for subsequent access by the scanning engine 430. The non-suspicious email messages may be discarded and precluded from further analysis by one or more data resources, such as one or more analytic engines $480_1$-$480_M$ (M≥1) described below.

As an optional feature, the down filtering logic 420 may be used to further reduce the number of analyses handled by the scanning engine 430. For instance, the content retrieval logic 400 performs the preliminary analysis as a first filter of the recovered email messages 160 to eliminate email messages that are unlikely to be malicious. However, in response to the number (or rate) of email messages being stored within the local data store 410 exceeding a prescribed threshold or scanning engine 430 experiencing difficulties in maintaining a predetermined throughput, the down filtering logic 420 may be utilized as a second filter to reduce the number of email messages for analysis based on further criterion. Continuing this example, email messages with an attachment less than a prescribed memory size (e.g., in kilobytes) are maintained for analysis while email messages with an attachment greater than the prescribed memory size are discarded. The prescribed memory size may be based on the current threat landscape associated with malicious attachments.

As still shown in FIG. 4, the scanning engine 430 is configured to select one or more analytic engines $480_1$-$480_M$ based on meta-information collected during analytics of an email message under analysis and identified during retrieval of the email message (e.g., source identifier, subscriber identifier that may identify a class of subscriber (e.g., IR team, paid subscriber, free-trial user, etc.)). This meta-information may be used to apply limits or expand the number of analytic engines $480_1$-$480_M$ to be used during analytics. According to one embodiment of the disclosure, the analytic engines $480_1$-$480_M$ may include, but are not limited or restricted to any combination of (i) a first analytic engine $480_1$ operating as appliance to analyze network traffic for malware; (ii) a second analytic engine $480_2$ operating as a cloud-based hosted service to analyze network traffic for malware; (iii) a third analytic engine $480_3$ to perform anti-virus analysis; and/or (iv) a fourth analytic engine $480_4$ operating in accordance with machine learning to identify malware based on heuristics or other historical threat detections, or the like.

As an illustrative example, the selection of the analytic engines $480_1$-$480_M$ may be based on customer preferences identified at registration (or subsequent modification of preferences) or may be based on default settings based on the object type and/or remote services from which the object is retrieved. As an illustrative embodiment, the first analytic engine $480_1$ (e.g., security appliance to analyze network traffic) does not support spam detection, while the second (cloud-based) analytic engine $480_2$, performing similar operations on email messages as the first analytic engine $480_1$, performs spam detection. Hence, if the customer prefers and desires spam detection as part of email analytics, the customer preferences may cause the scanning engine 430 to select the second (cloud-based) analytic engine $480_2$ over the first (appliance) analytic engine $480_1$.

More specifically, the scanning engine 430 receives an email message 432 queued in the local data store 410 (or directly from the content retrieval logic 400) and provides the email message 432 to one or more of the analytic engines $480_1$-$480_M$. Each of the selected analytic engines $480_1$ ... and/or $480_M$ is configured to process content within the email message 432 (e.g., process the email message within a virtual machine during which an URL is selected and operations with certain web servers may be emulated, attachments may be opened, etc.). After processing of the content within the email message 432, the analytic results 435 associated with the email message 432 may be returned to the local data store 410 for subsequent forwarding to the analytics correlation logic 440 or may be forwarded to the analytics correlation logic 440 directly.

Referring still to FIG. 4, the analytics correlation logic 440 is configured to receive analytic results 435 for the email message 432 from potentially different analytic engines and conduct a correlation of the analytic results 435. The correlation may include an aggregation of analytic results from different analytic engines (e.g., analytic engines $480_1$ and $480_4$), where the analytic results include meta-information and other context information associated with the analysis of the email message 432 for malware as well as meta-information collected during retrieval of the email message 432 (e.g., customer identifier, source identifier, etc.). The collection of meta-information and context information may be referred to as "consolidated meta-information 180."

Depending on the customer identifier, the analytics correlation logic 440 may organize the consolidated meta-information 180 differently to account for a different report format. For example, a scan request message initiated by an incident response (IR) team may request analytics to be conducted by all analytic engines $480_1$-$480_M$ and all meta-information generated from the analytics is captured and routed to the analytics correlation logic 440. Based on the customer identifier indicating a source of the scan request message being the IR team identifier, the analytics correlation logic 440 may aggregate the analytic results in a manner to provide a more comprehensive report given the purpose of the scan is to collect any or all meta-information that assist in determining an origin of a cyberattack. This purpose may differ from a scan request message initiated by another subscriber type (e.g., network administrator) that may favor a lesser comprehensive report that merely includes certain types of meta-information (e.g., timestamp, email source, email title, etc.) that assists a network administrator in her or his investigation of lateral movement of the malware.

The analytics correlation logic 440 may be communicatively coupled to the cloud services logic 450. The cloud services logic 450, when requested by the analytics correlation logic 440, attempts to collect additional context associated with the email message 432 under analysis or associated with any portion of the analysis results 435 associated with the email message 432. The additional context information may be included as part of consolidated meta-information 180 provided to the analytics classification logic 460.

The analytic classification logic 460 is configured to classify the email message 432 as "malicious" or "benign" based on the consolidated meta-information 180 based on classification rules 465 established for the current threat landscape. The classification rules 465 may be updated on a periodic or aperiodic basis. The analytic classification logic 460 is identifies whether the email message 432 includes malware, and if so, at least a portion of the context information 470 within the consolidated meta-information 180 is organized into a prescribed format and provided to the reporting logic 190. The reporting logic 190 renders the context information 470 into a perceivable format for conveyance to an administrator associated with the source issuing the scan request message 125. The reporting logic 190 may issue a malicious detection report (described below) or information from the malicious detection report as an alert message to the customer to notify of the presence of malware, and the RMDS 100 may respond to customer requests to mitigate the malware (e.g., delete email, disinfect, quarantine, etc.) and/or alert the remote service (e.g., second cloud-based email service 110$_2$) to assist in the mitigation of the malware infection.

Figure 5:
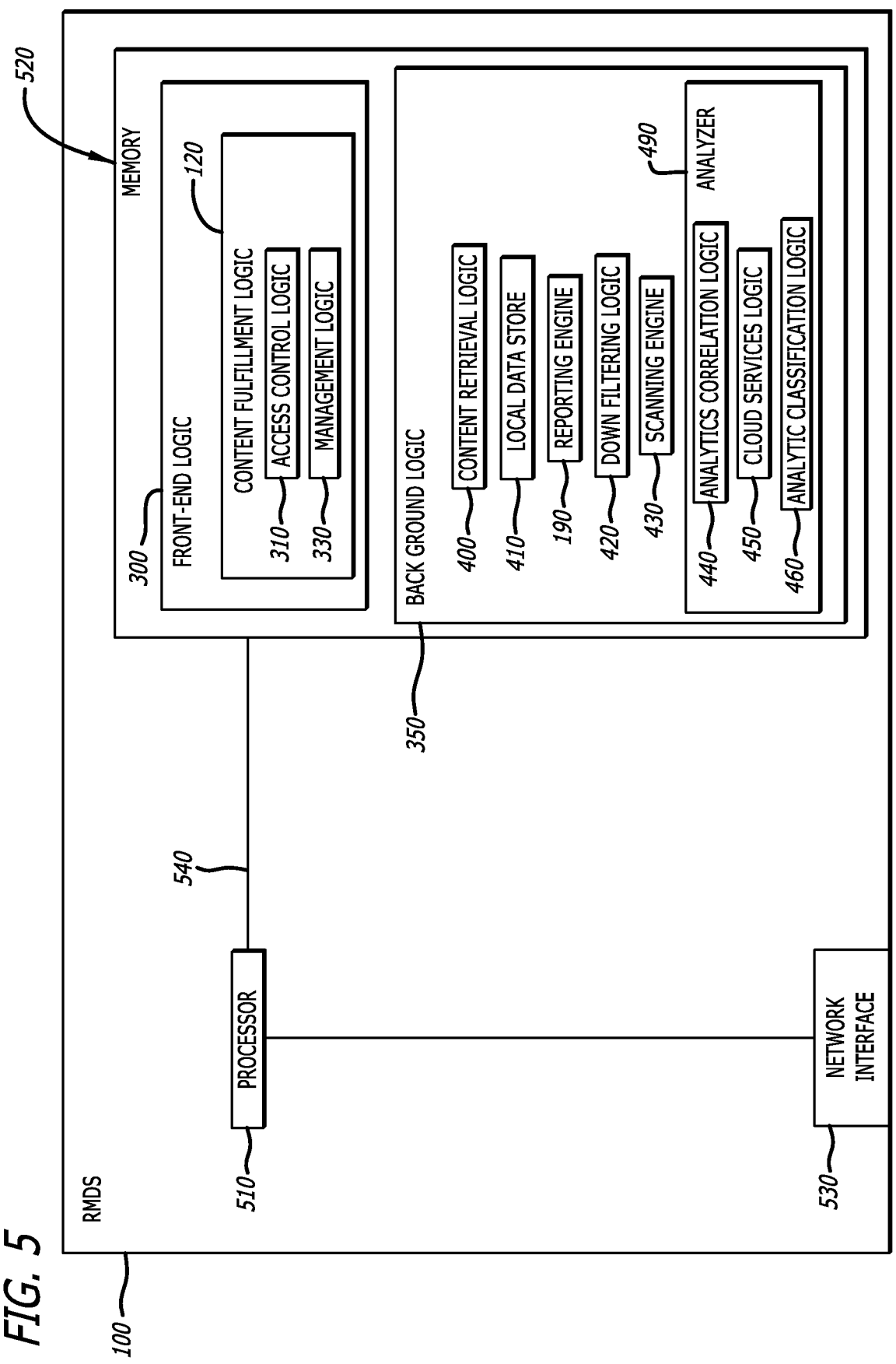
FIG. 5 is an embodiment of an exemplary architecture of the retroactive malware detection system (RMDS) of FIGS. 3-4.

Referring to FIG. 5, an embodiment of an exemplary architecture of the RMDS 100 of FIG. 1 is shown. For this embodiment, the RMDS 100 comprises a processor 510, memory 520 including retroactive evaluation logic 525, and one or more network interfaces 530, which are coupled together by a system interconnect 540, such as a bus. In general, as described below, the retroactive evaluation logic 525, when executed by the processor 510, perform operations that include (i) secures access credentials to one or more remote services; (ii) retrieve objects (e.g., email messages, files, etc.) from a selected remote service; (iii) performs one or more filtering operation prior to providing a subset of the retrieved objects to one or more analytic engines; and (iv) perform correlation of the analytic results to classify the object and reporting of such findings.

Herein, according to one embodiment of the disclosure, the processor 510 is one or more multipurpose, programmable components that accept digital information as input, process the input information according to stored instructions, and provide results as output. One example of a processor may include an Intel® x86 central processing unit (CPU) with an instruction set architecture although other types of processors as described above may be utilized.

The memory 520 operates as system memory, which may include non-persistent storage and/or persistent storage. The memory 520 includes the front-end logic 300 and back-end logic 350, as described above. The front-end logic 300 includes content fulfillment logic 120 that comprises the access control logic 310 and the management logic 330. The back-end logic 350 comprises the rule-based content retrieval logic 400, the local data store 410, the down filtering logic 420, the scanning engine 430, the analytics correlation logic 440, the cloud services logic 450, the analytic classification logic 460, and the reporting logic 190. The operations of software components of the front-end logic 300 and the back-end logic 350, upon execution by the processor 510, are described above.

V. RMDS Operational Flow

Figure 6A:
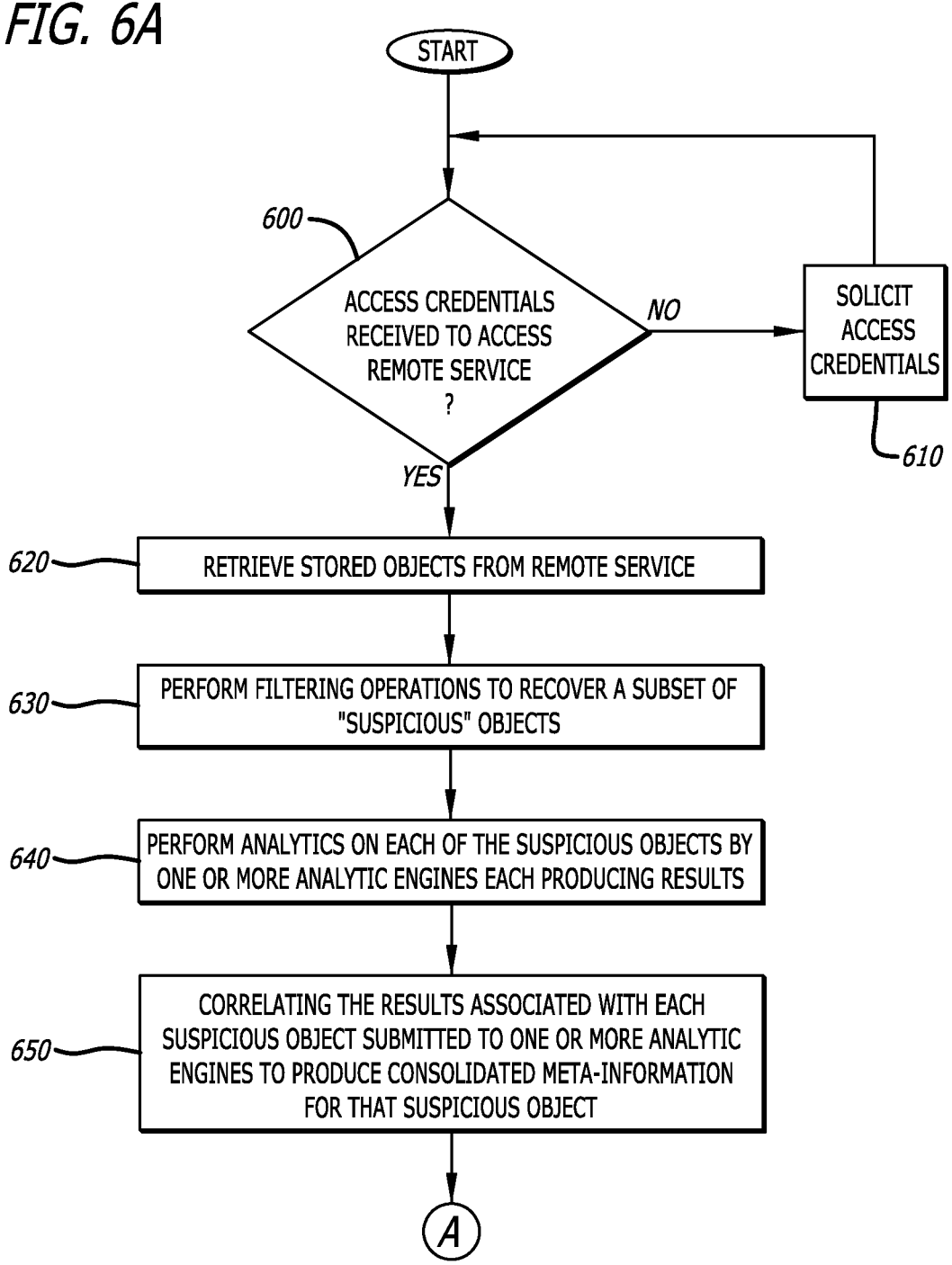
FIGS. 6A-6B are an exemplary flowchart of the operations conducted by the retroactive malware detection system (RMDS) of FIG. 1 in performing analytics on the stored objects to detect a presence of malware.
Figure 6B:
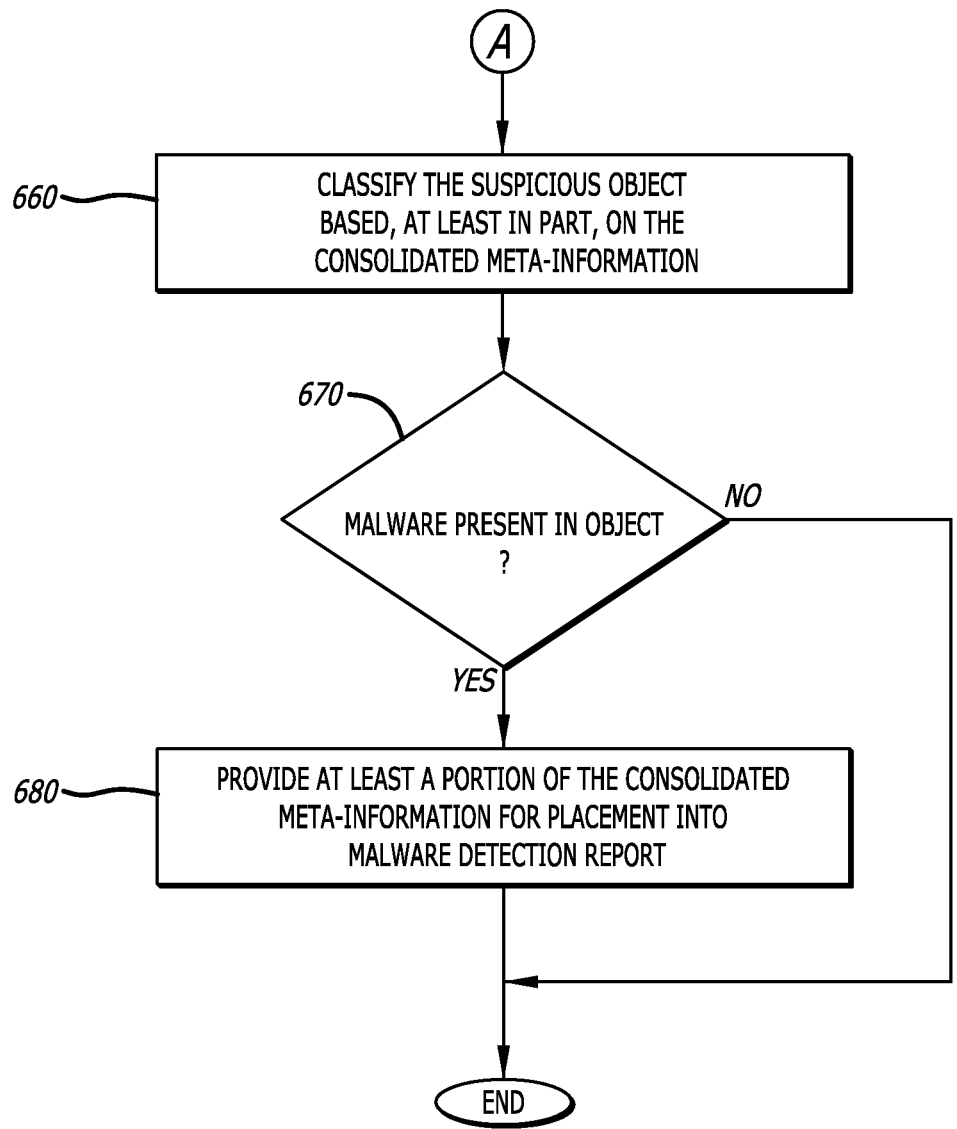

Referring now to FIGS. 6A-6B, an exemplary flowchart of the operations conducted by the retroactive malware detection system (RMDS) 100 in performing analytics of stored objects to detect a presence of malware is shown. First, as shown in FIG. 6A, the RMDS determines whether access credentials (consent) has been received to access a remote service with stored objects such as stored email messages (block 600). If the access credentials have not been received, the RMDS performs operations to solicit the return of such access credentials (block 610. However, if the access credentials have been received, content retrieval logic within the RMDS retrieves a plurality of objects from the remote service (block 620). These plurality of objects may undergo one or more filtering operations, performed in accordance with a first set of rules, to retain "suspicious" objects, which may be a subset of the plurality of objects. The "suspicious" objects are considered to be, based on the current threat landscape, objects with characteristics that are more apt to be determined to be malicious (block 630). Where the objects are email messages, the filtering operation(s) may involve permitting analytic operations to be conducted on certain types of email messages having (i) a body portion including a URL and/or (ii) an attachment that is lesser in size (e.g., byte size) than a prescribed threshold. This filtering produces a subset of objects that are permitted to undergo analytic operations by one or more analytic engines.

The scanning engine is configured to receive the subset of objects and to process each object of the subset of objects (block 640). More specifically, the scanning engine is configured to (i) receive the subset of objects and (ii) select a plurality of analytic engines for each object of the subset of objects. The selection of the plurality of analytic engine for an object may be based, at least in part, on meta-information associated with that object. The meta-information may include the source identifier (e.g., identifier of the remote service from which the subset of objects has been received), customer identifier (e.g., identifier of a source requesting a scanning operation), or the like.

The RMDS further includes analytic correlation logic, which is configured to aggregate the analytic results received from the analytic engines (block 650). The aggregation of the analytic results, referred to as "consolidated meta-information," where the consolidated meta-information includes meta-information and other context information associated with the analysis of the object for malware as well as meta-information collected during retrieval of the object from the remote service (e.g., customer identifier, source identifier, etc.) that prompted performance of the analytics, as described above.

As shown in FIG. 6B, during or after aggregation of the analytic results to produce the consolidated meta-information, the classification logic conducts an analysis of the consolidated meta-information associated with each retrieved object to determine, based on the consolidated meta-information, whether the retrieved object includes malware (blocks 660 and 670). If so, some or all of the meta-information associated with the retrieved object is maintained and included as part of a malware detection report (block 680). The malware detection report is made available to an administrator associated with a source of the scan request message that prompted the analytics of objects within the remote service. In some embodiments the generated report may include mitigations associated with each malicious object (e.g., quarantine malicious files, prevent retrieval of phishing emails, etc.). Otherwise, the object is considered benign and, according to this embodiment, is excluded from the malware detection report.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A non-transitory storage medium including logic for detecting malicious objects stored at a cloud-based remote service, comprising:
    first logic configured to (i) identify the cloud-based remote service hosting one or more objects and (ii) acquire access to the one or more objects stored within the cloud-based remote service;
    second logic configured to retrieve the one or more objects from the cloud-based remote service and submit the one or more objects to a plurality of analytic engines, each of the plurality of analytic engines being configured to conduct analytics on at least a first object of the one or more objects and generate results based on the analytics conducted on at least the first object; and
    third logic configured to conduct an analysis of meta-information associated with the first object to determine whether the first object is to be classified as malicious or benign,
    wherein the first logic is further configured to acquire a credential token in accordance with an authentication framework in which a retroactive malicious detection system registers with the cloud-based remote service as an agent to gain access to the one or more objects stored within the cloud-based remote service.

2. The non-transitory storage medium of claim 1, wherein the second logic is configured to gain access to the one or more objects being a plurality of electronic mail (email) messages stored within the cloud-based remote service operating as an cloud-based email service.

3. The non-transitory storage medium of claim 1, wherein the second logic is configured to gain access to the one or more objects being a plurality of files stored within a cloud-based file data store.

4. The non-transitory storage medium of claim 1, wherein the first logic includes content fulfillment logic being configured to (i) receive as input a scan request message, (ii) return as output a redirect message to an authorization portal controlling access to the cloud-based remote service, and (iii) receiving a credential token operating to acquire access to the cloud-based remote service.

5. The non-transitory storage medium of claim 1, wherein the results generated based on the analytics conducted on at least the first object include meta-information resulting from analyses of the first object by a first analytics engine and a second analytics engine of the one or more analytic engines.

6. The non-transitory storage medium of claim 1 further comprising:
    reporting logic communicatively coupled to the third logic including classification logic to generate a report including at least a portion of the meta-information associated with the first object.

7. The non-transitory storage medium of claim 1, wherein the second logic operating as content retrieval logic is configured to further perform a preliminary analysis of the one or more objects to eliminate objects unlikely to be malicious to create a subset of the one or more objects.

8. The non-transitory storage medium of claim 1 further comprising:
    filtering logic to reduce a number of one or more objects, including the first object, prior to submission of at least the first object of the one or more objects to the plurality of analytic engines selected based on meta-information accompanying the first object.

9. The non-transitory storage medium of claim 2, wherein the second logic operating as content retrieval logic to gain access to the stored email messages within the cloud-based email service based on access credentials received over a public network, the access credentials being received in response to the first logic generating a redirect message in response to a scan request message from a customer to conduct analytics the stored email messages within the cloud-based email service, wherein the redirect message redirecting communications from the customer to an authentication portal of the cloud-based email service operating as a logon page so that the access credentials are rerouted for use by the second logic.

10. A computerized method for retrieval and analysis of stored objects for malware, the method comprising:
    identifying a cloud-based service hosting one or more objects;
    acquiring access credentials to the cloud-based service to retrieve the one or more objects stored within the cloud-based service; and
    performing analytics on each object of the one or more objects to classify each object as malicious or benign by at least (i) selecting one or more analytic engines based on meta-information associated with a first object of the one or more objects, wherein each of the one or more analytic engines is configured to separately analyze the first object for malware, (ii) collecting analytic results from the one or more analytic engines, and (iii) classifying the first object as malicious or benign based on the collected analytic results,
    wherein the collecting of the analytic results from the one or more analytic engines includes aggregating the analytics results in accordance with a first prescribed format based on an identifier representing a first customer type and aggregating the analytics results in accordance with a second prescribed format based on an identifier representing a second customer type, wherein the first prescribed format differs from the second prescribed format.

11. The computerized method of claim 10, wherein prior to selecting the one or more analytic engines, the performing of the analytics comprises analyzing a first object of the one or more objects to determine whether the first object includes characteristics that necessitate further analyses in order to classify the first object as malicious or benign.

12. The computerized method of claim 10, wherein prior to identifying the cloud-based service, the computerized method further comprising:
    generating a redirect message in response to a scan request message, the redirect message (i) redirecting communications from a customer to an authentication portal of the cloud-based service operating as a logon page, and (ii) configuring receipt of access credentials for the cloud-based service upon verification of the customer.

13. The computerized method of claim 10, wherein the cloud-based service corresponds to a cloud-based email service and the one or more objects correspond to one or more email messages stored within the cloud-based email service.

14. The computerized method of claim 10, wherein the cloud-based service corresponds to a cloud-based file data store and the one or more objects correspond to a plurality of files stored within the cloud-based file data store.

15. The computerized method of claim 11, wherein at least one of the characteristics includes a presence of a Uniform Resource Locator (URL) link in a body portion of an email message being the first object.

16. The computerized method of claim 11, wherein at least one of the characteristics for the first object being an email message includes a presence of an attachment to the email message being less than a prescribed memory size.

17. The computerized method of claim 11, wherein the selecting of the one or more analytic engines based on the meta-information that is collected during the analyzing of characteristics of the first object and during retrieval of the first object from the cloud-based service.

18. The computerized method of claim 10 further comprising:

generating a malware detection report including one or more entries for each object of the one or more objects being classified as malicious, the one or more entries include at least an identifier of a customer and an identifier of a source of each email message of one or more email messages corresponding to the one or more objects.

* * * * *